United States Patent [19]

Noda

[11] 4,396,923

[45] Aug. 2, 1983

[54] RECORDING CONTROL APPARATUS

[75] Inventor: Atsushi Noda, Yokohama, Japan

[73] Assignee: Canon Kabushiki Kaisha, Tokyo, Japan

[21] Appl. No.: 141,923

[22] Filed: Apr. 21, 1980

[30] Foreign Application Priority Data

Mar. 16, 1979 [JP] Japan .................................. 54/60049

[51] Int. Cl.[3] .............................................. G01D 15/10

[52] U.S. Cl. ................................ 346/76 PH; 219/216

[58] Field of Search .................... 346/76 PH; 219/216; 400/120; 338/195

[56] References Cited

U.S. PATENT DOCUMENTS

| | | | |
|---|---|---|---|
| 4,113,391 | 9/1978 | Minowa | 346/76 PH X |
| 4,168,421 | 9/1979 | Ito | 346/76 PH X |
| 4,242,660 | 12/1980 | Cocca | 338/195 |

*Primary Examiner*—G. Z. Rubinson
*Assistant Examiner*—W. J. Brady
*Attorney, Agent, or Firm*—Fitzpatrick, Cella, Harper & Scinto

[57] ABSTRACT

A recording head having actuators driven by voltage supplied from a drive circuit constitutes a part of paths of a compensating circuit for compensating the drive voltage from the drive circuit. The paths are selectively cut off to compensate the drive voltage supplied to the actuators.

10 Claims, 10 Drawing Figures

RECORDING CONTROL APPARATUS

BACKGROUND OF THE INVENTION

1. Field of the Invention

The present invention relates to recording control apparatus having actuators as recording elements on a recording head and capable of forming characters and symbols on a recording medium by controlling the voltage supplied to the actuators.

2. Description of the Prior Art

The recording head employed in thermal printers or ink jet printers is generally provided with an array, in a matrix or line form, of actuators as recording elements to which voltage is selectively supplied to form characters and symbols on a recording medium. However such actuators are inevitably associated with fluctuations in the characteristics thereof among themselves and between different heads. For example resistors used in the thermal heads are prepared by semiconductor technology such as diffusion, thin film formation or thick film formation but the fluctuation in resistance is unavoidable in the technology.

Such fluctuation in resistance leads to a density fluctuation in printing on recording paper due to the difference in heat generation among the resistors, thus resulting in a deteriorated print quality.

It is empirically confirmed that the difference in density of characters printed on recording paper is visually not noticeable if the fluctuation in resistance is within a range of ±5% with respect to the mean value thereof. In the case of thermal heads having resistors arranged in a 5×7 or 1×7 dot matrix, it is technically possible to maintain the fluctuation in resistance within the range of ±5% with respect to the mean value within the same head.

Furthermore it is generally considered economically advantageous to maintain the tolerance in the fluctuation of resistance between different heads within a range of ±15% with respect to the means resistance. Consequently, the conventional method of avoiding the fluctuation in density of printed characters among different heads consists of classifying the heads according to the average resistance into the following three groups:

group A: 15%–5% of the mean resistance, group B: 5%–−5% of the mean resistance, and group C: −5%–−15% of the mean resistance, and changing the supplied voltage according to the groups thereby achieving constant heat generation.

FIG. 1 shows an example of circuitry for such a case, in which a slide switch 1 is connected at a terminal A directly, at a terminal B through a diode D1, and at a terminal C through diodes D1 and D2, to a power supply +V. Also a common terminal D of the slide switch 1 is connected to the common electrode for resistors R1, R2, . . . , Rn of a thermal head 2. Those resistors are connected at the other terminals thereof to drive transistors Tr1, . . . , Trn.

In the above-mentioned circuit the heat generation by the resistors is achieved by selective switching of drive transistors Tr1–Trn.

In the above-explained circuit, three different voltages can be supplied to the common terminal, depending upon the voltage drop across the diodes D1, D2 according to three different positions A-D, B-D and C-D of the slide switch. Positions A-D, B-D and C-D are selected respectively when the average resistance of the thermal head 2 belongs to the group A, B or C. In this manner a constant heat generation can be obtained through appropriate selection of the diodes D1, D2, and it is rendered possible to avoid fluctuation in the print density on a thermographic paper sheet. Such a conventional method is however defective in that the slide switch 1 has to be suitably shifted each time the thermal head 2 is exchanged, and in that the switch position A-D providing a high voltage, if erroneously selected for a low-resistance head of group C, will not only provide an abnormally high print density but also may undesirably affect the reliability of the recording head.

SUMMARY OF THE INVENTION

An object of the present invention is to provide recording control apparatus having a recording head capable of achieving compensation for the drive signals applied thereto.

Another object of the present invention is to provide recording control apparatus having a thermal head capable of achieving compensation for the drive signals supplied thereto.

Still another object of the present invention is to provide an inexpensive and compact thermal head.

Still another object of the present invention is to provide recording control apparatus having a drive control circuit capable of providing drive signals suitable for a thermal head.

DETAILED DESCRIPTION OF THE PREFERRED EMBODIMENTS

Figure 1:
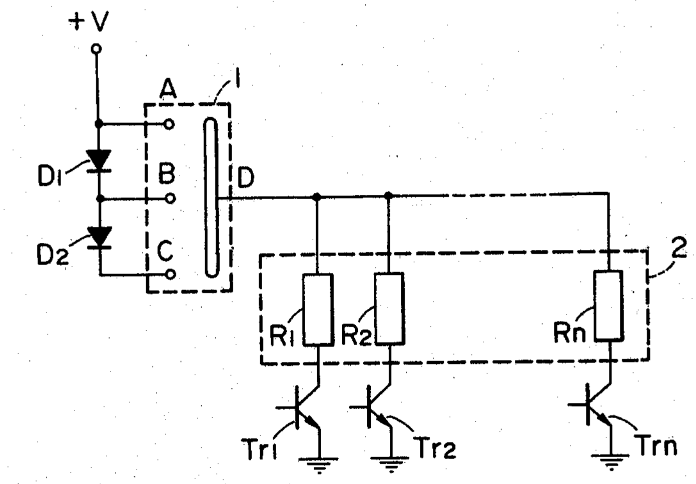
FIG. 1 PRIOR ART
FIG. 1 is a schematic circuit diagram of a thermal head drive circuit for a conventional thermal recording apparatus.
Figure 2:
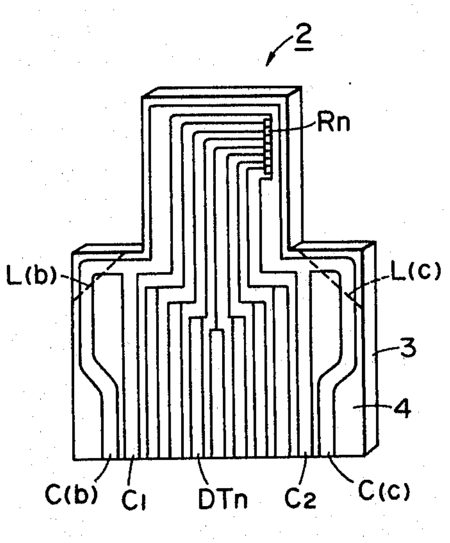
FIG. 2 is an external view of a thermal head in accordance with the present invention.

With reference to FIG. 2 showing a thermal head 2 in accordance with the present invention in an external view, there are formed seven resistors Rn on an insulating substrate 3. A common electrode of the resistors is divided on substrate 3 into four patterns constituting common terminals C1, C2 and voltage compensating patterns is followed by voltage compensating terminals C(b), C(c) in an area 4. The other terminals of the resistors are also patterned on substrate 3 to form seven signal terminals DTn in area 4. These eleven terminals are connected at area 4 to an flexible cable (not shown) either by contact or by soldering and thus further to a drive control circuit.

Figure 3:
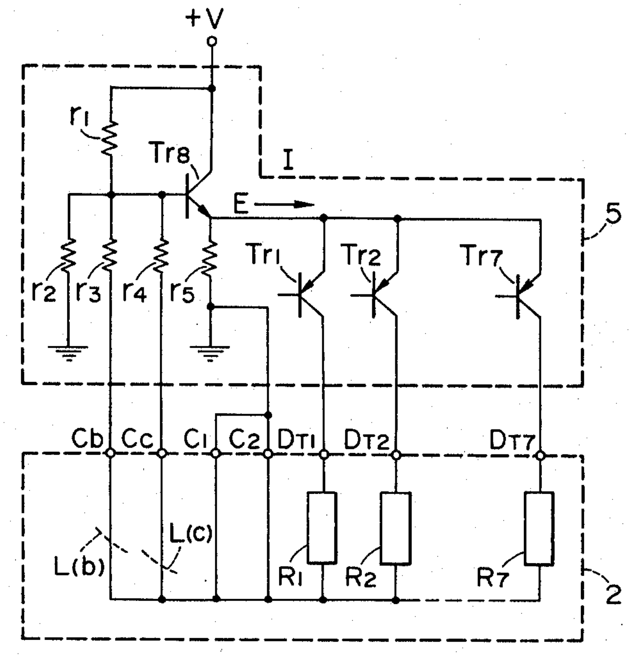
FIG. 3 is a schematic circuit diagram of a thermal head drive circuit in accordance with the present invention.

FIG. 3 shows a drive control circuit for the thermal head of the present invention, in which there are shown switching transistors Tr1, Tr2, . . . , Tr7, bias resistors r1, r2, r3, r4 for an amplifying transistor Tr8, and a stabilizing resistor r5 for stabilizing the potential at the point E. The potential of point E connected to an emitter electrode of the transistor Tr8 is determined by the ratio of total resistance of r2, r3 and r4 to the resistance of r1. The bias resistors r3, r4 are respectively connected to the voltage compensating terminals C(b), C(c) of the thermal head 2 to constitute a compensating circuit for adjusting the voltage supplied to the head from a thermal head drive circuit composed of transistors, resistors, etc. The resistance of the thermal head 2 is measured beforehand, and the voltage compensating terminal C(c) or C(b) is cut at the broken line L(c) or L(b) in FIG. 2 respectively when the head belongs to the group C or B. In case the head belongs to the group A, both voltage compensating terminals are cut at the broken lines L(b) and L(c). Thus the voltage at the point E is determined by the ratio of r1 to r2r3/(r2+r3) when a head of group C is mounted, by the ratio of r1 to r3r4/(r3+r4) when a head of group B is mounted, and by the ratio of r1 to r2 when a head of group A is mounted.

In this manner it is possible to adjust the supplied voltages so as to obtain a constant print density from the heads of the groups A, B and C through suitable selection of the resistances of the bias resistors r1, r2, r3 and r4.

Figure 4A:
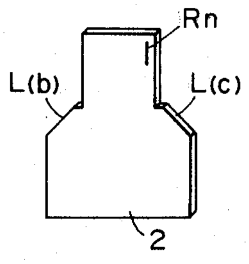
FIGS. 4A, 4B and 4C are explanatory views of the embodiments in accordance with the present invention.
Figure 4B:
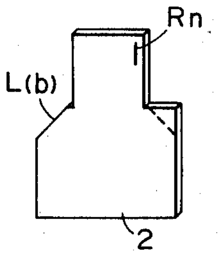
Figure 4C:
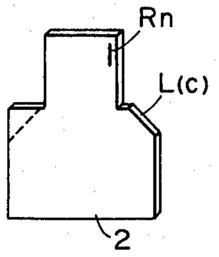

When the heads are classified into the three groups A, B and C at the last step of manufacturing the head, the voltage compensating terminals C(b) and C(c) are selectively cut off as shown in FIGS. 4(A)-4(B) according to the classification. In this manner the heads can receive appropriate voltage to provide a constant print density, thus achieving constant print quality and reliability without any adjustment in the drive control circuit at the mounting or replacement of the head.

Figure 5:
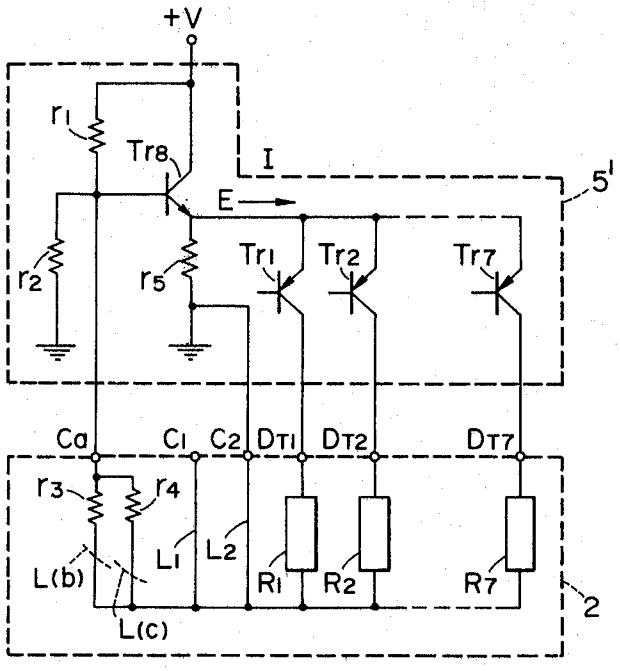
FIGS. 5 and 6 are schematic circuit diagrams of drive circuits in accordance with the present invention.

FIG. 5 shows another embodiment of the thermal head and the drive control circuit therefor in which bias resistors r3, r4 connected in parallel on the substrate 3 are connected, through a voltage compensating terminal C(a), which units terminals C(b) and C(c), to a drive control circuit 5'. Such an embodiment is advantageous in reducing the cost and the size of the thermal head as the number of compensating terminals is reduced to one.

It is furthermore possible to eliminate the voltage compensating terminal for the resistor Rn, thus enabling further cost reduction and miniatuarization, by inserting resistors in the lines L1, L2 connected to common terminals C1, C2 and cutting off those resistors in determined combinations thereby adjusting the resistance in the paths L1, L2 to adjust the voltage supplied to the resistor Rn.

Figure 6:
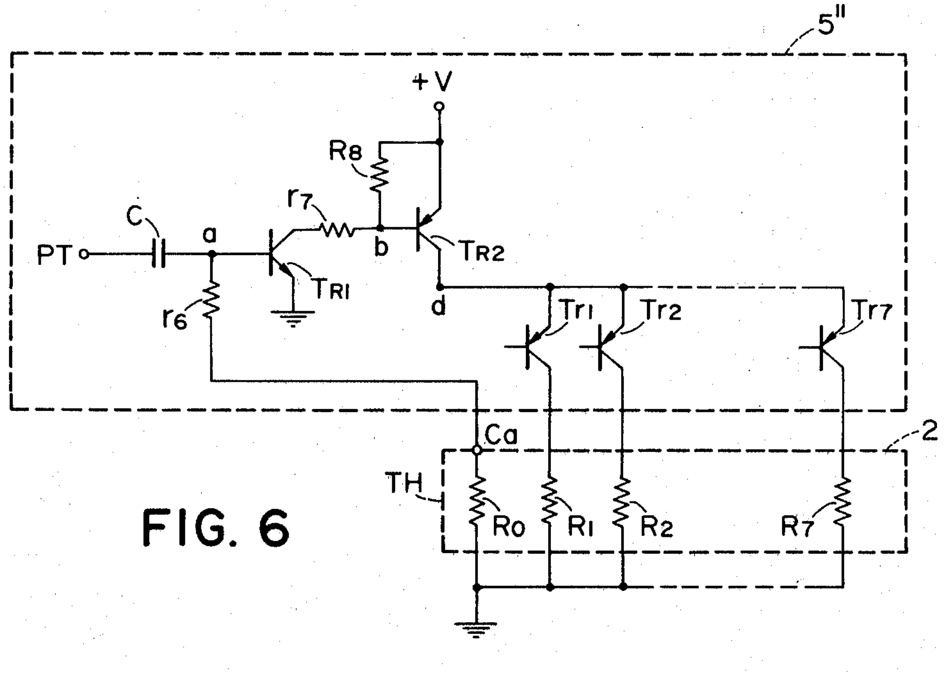

FIG. 6 shows still another embodiment in which a dummy resistor R0 is prepared with the resistors Rn under the same conditions in the manufacture of the head in such a manner that the resistance of the dummy resistor is maintained within a tolerance of ±5% with respect to the resistances of heating resistors in the same head. In a drive control circuit 5'', a print signal PT from printer control circuit (not shown) is supplied through a capacitor C to the base electrode a of a transistor Tr1, of which the emitter electrode is grounded and also connected through a resistor r7 to the base electrode b of a transistor Tr2. Also a power supply +V is connected through a resistor r8 to the base electrode b of the transistor Tr2 and connected directly to the emitter electrode of the transistor Tr2, of which collector electrode d is connected to the emitter electrodes of switching transistors Tr1–Tr7 for the resistors Rn, wherein the heat generation is achieved by current supply to the resistors R1–R7 through selective switching of transistors Tr1–Tr7.

Dummy resistor R0 on the thermal head 2 is connected through a voltage compensating terminal C(a) to the base electrode of the transistor Tr1 to constitute a compensating circuit for determining the voltage supply time for resistors Rn in the following manner.

Figure 7:
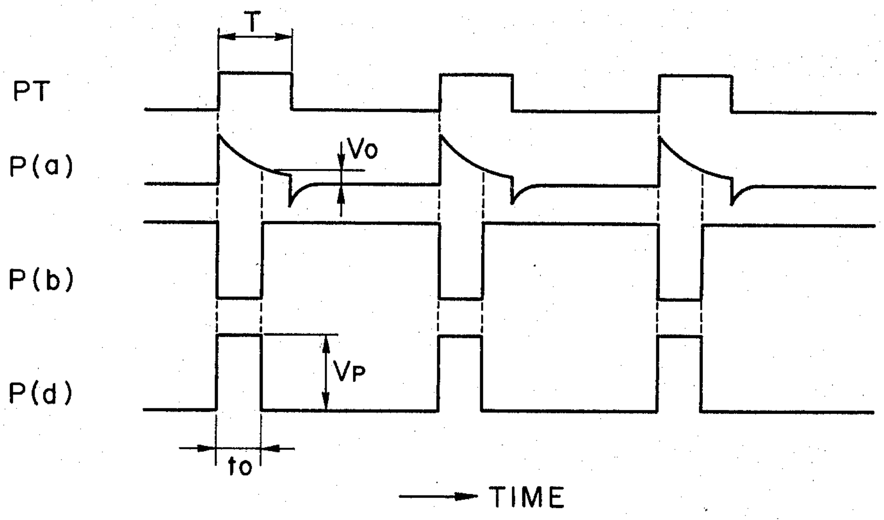
FIG. 7 shows waveforms useful in understanding the operations of the embodiment shown in FIG. 6.

Now referring to FIG. 7, upon receipt of the print signal PT, there is generated a signal P(a) of a logarithmic waveform at the point a by the dummy resistor R0, resistor r6 and capacitor C. Upon arrival of the signal P(a) at the threshold voltage V0 of the transistor Tr1, transistor Tr1 is closed to provide a pulse signal P(b) of a pulse width t0 at the point b. Consequently through the transistor Tr2 there is obtained a thermal head drive signal P(d) with a pulse width t0 and a voltage vp. A pulse width t0 achieving the optimum print density is obtained by appropriate selection of the capacitor C and the resistor r6. If the resistances in a thermal head are higher than a standard value, the resistance of the dummy resistor R0 is accordingly higher to provide a milder slope in the signal P(a) thereby giving a shorter pulse width t0. On the other hand if the resistances in a thermal head are lower than the standard value, the resistance of the dummy resistor R0 is accordingly lower to provide a steeper slope in the signal P(a) thereby giving a longer pulse duration t0.

As explained in the foregoing, the present embodiment allows provision of a longer pulse width t0 in the case of a head having a higher resistance and a shorter pulse width t0 in the case of a head with a lower resistance for a determined supply voltage.

Since the print density is generally proportional to the product of the applied electric power $W=V^2/R$ and the pulse width t0, and W is inversely proportional to the power W, then $W\times t0=V^2/t_0\times t_0$ becomes constant. Thus in this manner it is possible to obtain a constant print density regardless of the fluctuation in the average resistance of each thermal head 2 represented by the resistance of the dummy resistor R0.

The dummy resistor R0, being only used for a small current for driving the transistor Tr1, does not generate sufficient heat to cause color development on the thermographic paper or generation of bubbles in the liquid to cause liquid droplet emission in the ink jet nozzle.

As discussed in the foregoing, the present embodiment allows realization of a thermal printer maintaining a constant print density in a simple and inexpensive manner through the use of the dummy resistor R0 in the print density control circuit provided in the recording head.

Figure 8:
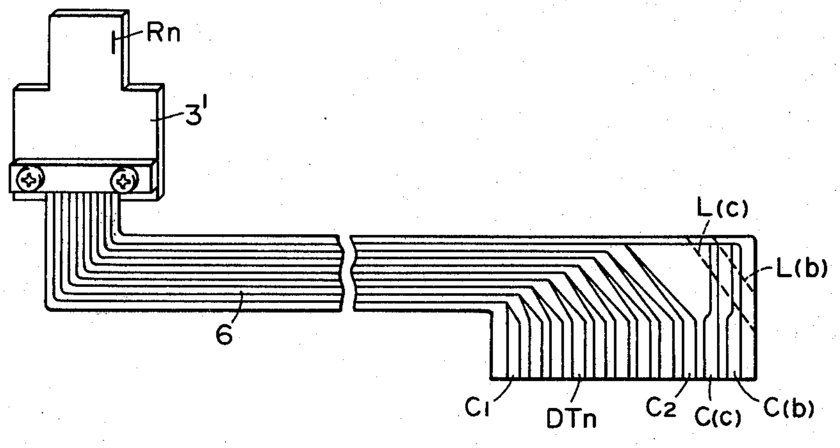
FIG. 8 is an external view of a thermal head in accordance with the present invention.

FIG. 8 shows still another embodiment of the present invention, in which a thermal head having a substrate and a flexible cable is connected to an ordinary circuit board 3c' not provided with voltage compensating terminals through soldering or detachable coupling of the flexible cable on which voltage compensating terminals C(b), C(c) are printed. Broken lines L(b), L(c) are printed on flexible cable 6 to facilitate cutting for example with scissors, thereby modifying the combinations of the bias resistors r1, r2, r3 and r4 for the transistor Tr8.

The embodiments shown in FIGS. 2, 3, 4 and 5 may be employed in combination with the drive control circuit 5'' as shown in the embodiments of FIGS. 6 and 7 for modifying the voltage supply time in place of the drive control circuit 5 or 5' for compensating the voltage supplied to the resistors Rn, which in turn may be employed in combination with the embodiments shown in FIGS. 6 and 7.

Although the foregoing explanation is made with respect to the recording control apparatus for a thermal head, the present invention is by no means limited to such applications but is also similarly applicable for example in a recording apparatus with an ink jet recording head provided with piezoelectric elements as recording elements.

What I claim is:

1. A recording control apparatus comprising:

a recording head including;

a heat generating resistor for generating heat by a drive signal;

a drive signal compensating pattern of which a part of a path of said pattern is cut off at a position providing an indication of a cutting position in response to a resistance value peculiar to said heat generating resistor; and a recording head drive circuit including:

a switching element for selectively supplying said drive signal to said heat generating resistor;

a first element for determining the voltage of said drive signal in response to a second element; and a second element, one end of which is connected to said first element and the other end is connected to said compensating pattern.

2. A recording control apparatus according to claim 1, wherein said recording head includes a plurality of signal terminals for supplying drive signals to a plurality of heat generating resistors and to said second element, and wherein said recording head further includes a common terminal connected to one end of said compensating pattern and a compensating terminal connected to the other end of said pattern.

3. A recording control apparatus according to claim 1 or claim 2, wherein said compensating pattern of said recording head includes a plurality of resistors in the path thereof.

4. A recording control apparatus comprising:

a recording head including:

(1) a plurality of heat generating resistors being connected to a plurality of first terminals fixed on said head for generating heat by drive signals supplied through said plurality of first terminals; and, a dummy heat generating resistor having characteristics similar to that of said heat generating resistors and being connected to a second terminal fixed on said head; and, (2) a recording head drive circuit having a transistor element for determining the voltage of drive signals to be supplied to said plurality of heat generating resistors through said plurality of first terminals in response to a resistance value of said dummy heat generating resistor when connected to said second terminal.

5. A recording control apparatus provided with a thermal head comprising:

a plurality of resistors functioning as heat generating elements on the surface of said head;

a common terminal connecting each of said plurality of resistors through a common pattern and mounted on one end of the surface of said head;

signal terminals equal in number to said plurality of resistors and separately connected to each of said plurality of resistors through signals patterns, said signal terminals being mounted on the one end of the surface of said head; and a compensating terminal connected to said common terminal through a compensating pattern and mounted on the one end of the surface of said head.

6. A recording control apparatus according to claim 5, wherein said resistors mounted on an insulation base plate are provided with a flexible cable including said common terminal, said signal terminals and said compensating terminal which are positively secured on said plate.

7. A recording control apparatus according to claim 5 or 6, including an indication for indicating a cutting position mounted on said compensating pattern.

8. A recording control apparatus comprising:

a recording head having a plurality of heat generating resistors each with similar character; and means for determining the voltage of drive signals to be supplied to the resistors in response to a resistance value of the resistors when at least one of the resistors is connected thereto.

9. A recording control apparatus according to claim 8, wherein one of the plurality of resistors is a dummy resistor which does not receive a drive signal; and wherein said means determines the voltage of the drive signals in response to the resistance value of the dummy resistor.

10. A recording control apparatus comprising:

(1) recording means including:

heat generating means for generating heat by a drive signal; and compensating means for determining the voltage of the drive signal to be supplied to said heat generating means by cutting off said recording means at a position providing an indication of a cutting position in response to the voltage peculiar to said heat generating means; and (2) means for providing the drive signal which is being determined by said compensating means for said heat generating means.

* * * * *